United States Patent Office 2,819,323
Patented Jan. 7, 1958

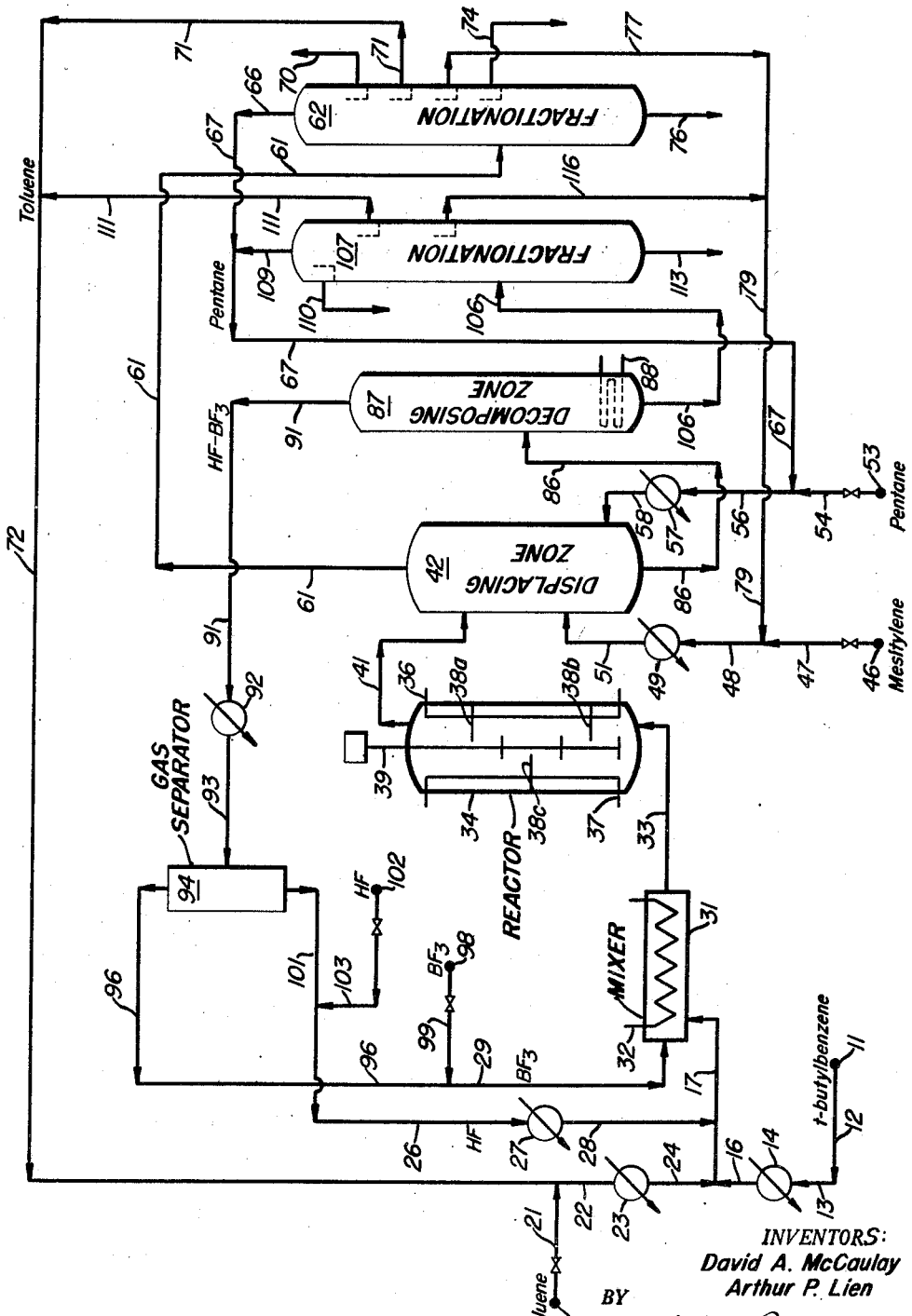

2,819,323

TERTIARY BUTYLTOLUENE PRODUCTION

David A. McCaulay, Chicago, Ill., and Arthur P. Lien, Highland, Ind., assignors to Standard Oil Company, Chicago, Ill., a corporation of Indiana Application November 27, 1953, Serial No. 394,712

11 Claims. (Cl. 260—671)

This invention relates to the production of t-butyltoluene, i. e., t-butylmethylbenzene and di-t-butylmethylbenzene. More particularly the invention relates to the production of essentially pure meta-t-butyltoluene and 1,3,5-di-t-butyltoluene.

The preparation by the chemical industry of particular compounds in very high purity has resulted in a demand for individual alkylbenzenes. Those possessing the 1,3- and 1,3,5-configuration are particularly desired. The t-butyltoluene and di-t-butyltoluene are of interest.

It is an object of this invention to produce t-butyltoluene. Another object is the production of meta-t-butyltoluene. Still another object is the preparation of the symmetrical 1,3,5-di-t-butyltoluene. A particular object is the preparation of meta-t-butyltoluene in very high yield. Still another object is a process for the preparation of essentially pure 1,3,5-di-t-butyltoluene and meta-t-butyltoluene by the interaction of a t-butylbenzene with toluene.

High purity 1,3,5-di-t-butyltoluene and meta-t-butyltoluene are prepared by interacting toluene and a member selected from the class consisting of t-butylbenzene, di-t-butylbenzene and tri-t-butylbenzene; a mol ratio of toluene to t-butyl groups in said butylbenzene of at least about 0.7 is used. The interaction is carried out in the presence of at least enough liquid HF to form a separate acid phase and at least about 0.7 mol of $BF_3$ per mol of t-butyl groups in said t-butylbenzene. The mixture of feed and HF—$BF_3$ agent is maintained at a temperature of not more than about +25 C. for a time sufficient for the formation of a reaction product containing a t-butyltoluene fraction which consists of high purity meta isomer. A product hydrocarbon mixture is obtained by removing HF and $BF_3$ and high purity, 1,3,5-di-t-butyltoluene and meta-t-butyltoluene are recovered from the product mixture.

As used herein, interaction involves two alkylbenzenes containing different alkyl groups reacting to transfer an alkyl group from one alkylbenzene to the other alkylbenzene to form an alkylbenzene containing at least two different alkyl groups. Disproportionation as generally understood differs from interaction in that the two alkylbenzenes involved in the reaction contain the same alkyl groups; thus disproportionation involves the reaction of two alkylbenzenes containing the same alkyl groups wherein an alkyl group is transferred from one alkylbenzene to the other alkylbenzene to produce an alkylbenzene containing more alkyl groups than are present in the parent alkylbenzenes.

To illustrate: The process of this invention involves the interaction of toluene and a t-butylbenzene to form t-butyltoluene, di-t-butyltoluene and benzene. In the absence of toluene, t-butylbenzene undergoes a disproportionation to produce di-t-butylbenzene, tri-t-butylbenzene and benzene.

The tertiary butylbenzene component of the feed to the process is a member selected from the class consisting of tertiary butylbenzene, di-tertiary butylbenzene, tri-tertiary butylbenzene and mixtures thereof. It is preferred to use the t-butylbenzene and di-t-butylbenzenes.

The other reactive component of the feed is toluene.

In addition to the toluene and t-butylbenzene, the feed may contain hydrocarbons which are inert to the action of the HF—$BF_3$ agent and also do not participate to any appreciable extent in interaction with either toluene or t-butylbenzene. Examples of reactive aromatic hydrocarbons are xylene, ethylbenzene and isopropylbenzene.

Benzene is a by-product of the interaction process of this invention. The presence of added benzene when it is all dissolved in the acid phase has no significant adverse effect on the direction of the interaction; however, the presence of large amounts of added benzene in the feed is not desirable.

Paraffins, particularly the lower boiling paraffins, do not in themselves have an adverse effect on the interaction. Owing to their low solubility in the acid phase, the presence of more than a small amount of paraffins, e. g., 3%, in the feed results in the presence of a second hydrocarbon phase in the reaction zone. The presence of a second hydrocarbon phase in the reaction zone has an adverse effect on the rate of interaction and the yield of interaction product.

It is preferred to operate under conditions of feed composition and amounts of liquid HF and $BF_3$ usage such that essentially a single homogeneous liquid phase exists in the reaction zone, i. e., essentially all the feed is dissolved in the acid phase.

The feed to the interaction process should contain toluene and t-butylbenzene in a mol ratio of toluene to t-butyl groups of at least about 0.7; preferably the mol ratio should be at least about 1. The presence of t-butyl groups in an amount in excess of the ability of the toluene present to accept them and to form t-butyltoluenes results in the production of disproportionation products of the t-butylbenzene. While these poly-t-butylbenzenes can be recycled to the interaction process, it is wasteful and therefore the use of an excess of t-butyl groups should be avoided. The interaction between t-butylbenzenes and xylene proceeds very rapidly to the desired t-butylxylene even at low toluene to t-butyl group ratios. The preferred mol ratio of toluene to alkyl groups in the t-butylbenzene charged is between about 1 and 1.2. More than this usage results in the presence of a separate hydrocarbon phase, mainly toluene, in the reaction zone.

To illustrate: When the reactive components in the feed consist essentially of toluene and mono-t-butylbenzene, the preferred mol ratio of toluene to mono-t-butylbenzene is between about 1 and 1.2. When the reactive components in the feed are essentially toluene and di-t-butylbenzene, the preferred mol ratio of toluene to di-t-butylbenzene is between about 2 and 2.4.

The process is carried out under substantially anhydrous conditions. The liquid hydrogen fluoride used should contain not more than about 2 or 3% of water. Commercial grade anhydrous hydrofluoric acid is suitable.

Enough liquid HF must be present in the reaction zone to form a separate distinct acid phase. More than this amount is desirable; usually between about 3 and about 50 mols of liquid HF are used per mol of alkylbenzene charged, i. e., toluene and t-butylbenzenes. The preferred usage of liquid HF is between about 5 and 20 mols.

Boron trifluoride, i. e., $BF_3$, must be present in the reaction zone in at least a catalytically effective amount, for example, 0.1 mol per mol of t-butyl groups charged. In order to maximize the yield of t-butyl-toluenes, at least about 0.7 mol of $BF_3$ should be used per mol of t-butyl groups charged. More than this amount of $BF_3$ has a favorable influence on the interaction. The preferred BF$_3$ usage is between about 1 and about 1.5 mols per mol of t-butyl groups charged.

To illustrate: When t-butylbenzene is charged, the preferred BF$_3$ usage is between about 1 and 1.5 mols per mol of t-butylbenzene. When di-t-butylbenzene is charged, the preferred BF$_3$ usage is between about 2 and 3 mols per mol of di-t-butylbenzene.

The interaction is carried out at a temperature of not more than about +25° C. Operation at this temperature for times in excess of about 60 minutes or for shorter times at higher temperatures results in a considerable amount of side reaction products which appear to be condensed ring compounds. The interaction may be carried out at temperatures as low as −75° C. It is preferred to operate the process at a temperature between about 0° and about +15° C.

The interaction rate is favorably influenced by higher temperatures. Thus, at a temperature of about 25° C. the interaction of toluene and t-butylbenzene will proceed to essentially pure 1,3,5-di-t-butyltoluene and meta-t-butyltoluene within a minute or so. At −75° C. several hours are needed for the essentially complete conversion of the t-butyl groups to the t-butyltoluenes. Operation in the preferred temperature range of between about 0° and +15° C. is relatively independent of the time of contacting; the preferred range of contacting times at the preferred temperature is between about 5 and about 30 minutes.

When trit-t-butylbenzene is charged, longer contacting times are necessary.

The term "high purity" means a di-derivative fraction containing at least about 95% of the meta isomer and a tri-derivative fraction containing at least about 95% of the 1,3,5-isomer.

Even when two distinct liquid phases are present in the reaction zone, the t-butyltoluene interaction product is found almost entirely in the acid phase. The t-butyltoluenes are present in the acid phase in the form of a complex containing 1 mol of BF$_3$ and probably 1 mol of HF per mol of t-butyltoluene.

PRODUCT RECOVERY

The reaction product mixture may be recovered from the acid phase by various methods. Probably the simplest procedure and one most suitable for laboratory work consists of adding the acid phase to crushed ice or the acid phase may be contacted with cold aqueous alkaline solution, such as sodium hydroxide, potassium hydroxide and ammonia. It is desirable to prevent rearrangement reactions by the use of a cold aqueous reagent.

The hydrocarbons originally present in the acid phase appear as an upper oil layer above a lower aqueous layer. The upper oil layer may be separated by decantation and may be treated with dilute aqueous alkaline solution to remove any remaining HF and BF$_3$ occluded therein.

Both HF and BF$_3$ are relatively expensive chemicals and it is desirable in an economic process to recover these and to recycle them for reuse in the process. The HF and the BF$_3$ may be readily removed from the acid phase by heating the acid phase or by applying a vacuum thereto. The HF and the BF$_3$ distill overhead and may be recovered for reuse in the process. When di-alkylbenzenes and/or tri-alkylbenzenes are the principal complex forming hydrocarbons, the complex may be decomposed at relatively low temperatures by the use of vacuum distillation.

Rearrangement reactions proceed from the time that the complex is formed until the complex is decomposed, assuming that a suitable temperature exists. It is necessary to take into account the total time elapsing from the time that the complex has been formed till the time that it has been decomposed in the distillative decomposition procedure. Thus, when using distillative decomposition procedure, it is necessary to consider the residence time of the complex in the decomposing zone as a part of the contacting time.

Also, it is necessary to consider the temperature maintained in the decomposing zone when a particular product or a particular ratio of products is desired. Generally the temperature in the decomposing zone must be no higher than that which can be used in the contacting zone. The distillative decomposing zone may be operated at temperatures as low as about −20° C. by the use of high vacuum or a low boiling stripping agent, such as propane.

Owing to the relatively low temperature at which cracking reactions begin with the t-butyltoluenes, the preferred method of recovering t-butyl-toluenes from an acid phase is by the displacement of the t-butyltoluenes from the HF—BF$_3$ complex by an alkylbenzene which forms a more stable HF—BF$_3$ complex. Broadly, the displacer is a polyalkylbenzene containing at least three alkyl groups which alkyl groups are selected from the class consisting of normal and secondary and which contain not more than 4 carbon atoms. Normal alkyl groups are methyl, ethyl, n-propyl and n-butyl. Secondary alkyl groups are isopropyl and secondary butyl.

Pentamethylbenzene and hexamethylbenzene are particularly effective displacers. However, the complexes formed by these compounds are so stable that quite elevated temperatures are necessary to decompose the complexes in order to recover the HF and BF$_3$.

The preferred tri-alkylbenzenes have the symmetrical configuration, i. e., 1,3,5-tri-alkylbenzene. The preferred tetra-alkylbenzenes possess the 1,2,3,5 configuration. These displacers are preferred because they do not tend to undergo rearrangement reactions and have better displacement effectiveness than the other isomers. The preferred displacers are mesitylene and isodurene because they have the least tendency toward interaction with the product t-butyltoluenes.

Theoretically, 1 mol of added displacer will replace 1 mol of t-butyltoluene or di-t-butyltoluene. However, the amount of displacer used is dependent upon the total recovery of t-butyltoluene desired and also the effectiveness of the contacting of the acid phase and the displacer. It is preferred to operate with a very large excess of displacer in order to remove essentially all the t-butyltoluenes present in the acid phase. The preferred usage of displacer, when using mesitylene as the displacer, is between about 3 and 10 mols per mol of t-butyltoluene and di-t-butyltoluene in the acid phase.

The acid phase possesses an extremely high solubility for aromatic hydrocarbons. Quite a large amount of displacer can be added to the acid phase without apparently displacing any t-butyltoluene; the displaced t-butyltoluene remains dissolved in the acid phase. By the use of very large amounts of displacer, it is possible to produce a second liquid phase which comprises displaced t-butyltoluene and displacer.

Since paraffinic hydrocarbons are soluble in the acid phase to only a relatively small extent, it is possible to wash from the acid phase-displacer solution the displaced t-butyltoluenes. The wash hydrocarbon must be inert to the action of HF and BF$_3$ and non-reactive with the alkylbenzenes present in the acid phase. Benzene and toluene may be used as wash hydrocarbons. It is preferred to use as the inert hydrocarbon a low boiling liquid paraffin such as propane, butane, pentane and hexane.

The wash hydrocarbon may be introduced into the acid phase-displacer solution simultaneously with the displacer, preferably as a single solution; or the wash hydrocarbon may be introduced into the acid phase after the addition of the displacer. In order to avoid rearrangement reactions, it is preferred to introduce the wash hydrocarbon substantially simultaneously after the introduction of the displacer.

It is preferred to carry out the displacement operation in a continuous countercurrent tower; in such an operation the acid phase is introduced in an upper portion of the tower, the displacer is introduced at a lower portion of the tower and the inert wash hydrocarbon is introduced at a point of the tower below the point of entry of the displacer.

The amount of inert wash hydrocarbon introduced must be enough to remove essentially all the displaced t-butyltoluenes. In general, the amount of inert wash hydrocarbon used is between about 100 and 500 volume percent based on secondary alkyltoluene displaced, preferably between about 150 and 250 volume percent.

In order to avoid rearrangement reactions, the displacing zone should be operated at a temperature and for a contacting time such that essentially no rearrangement reactions take place therein. Thus, the contacting time in the displacing zone and the temperature therein must be considered in determining the total contacting time to be utilized in the process.

ILLUSTRATIVE EMBODIMENT

The annexed figure, which forms a part of this specification, shows an illustrative embodiment of a method of carrying out the invention to produce essentially pure meta t-butyltoluene and 1,3,5-di-t-butyltoluene interacting t-butylbenzene and toluene. The figure is schematic and many items of equipment have been omitted, such as pumps, valves, etc., as these may be readily added thereto.

Tertiary butylbenzene from source 11 is passed by way of lines 12 and 13 into heat exchanger 14. From exchanger 14 it is passed by way of line 16 into line 17.

Toluene from source 19 is passed by way of valved line 21 and line 22 into heat exchanger 23. From exchanger 23, the added toluene and recycled toluene are passed by way of line 24 into line 17. The toluene to t-butylbenzene ratio is 1.1.

Anhydrous liquid hydrogen fluoride (14 mols/mol of alkylbenzene feed) is passed from line 26, through heat exchanger 27 and line 28 into line 17. Heat exchangers 14, 23 and 27 lower the temperature of the t-butylbenzene, toluene and the liquid HF to a temperature of about 0° C. This temperature is about 10° C. lower than the desired reaction temperature of +10° C.

The contents of line 17 are introduced into mixer 31 which is provided with heat exchanger means 32. 1.2 mols of BF$_3$ per mol of t-butylbenzene from line 29 is introduced into mixer 31. Mixer 31 is an apparatus able to rapidly intermingle the t-butylbenzene, toluene, liquid HF and BF$_3$. The heat exchanger means 32 withdraws heat of complex formation and prevents the temperature at the discharge end of mixer 31 rising above +10° C.

An acid phase consisting of liquid HF, dissolved complex, toluene and BF$_3$ is discharged from mixer 31. About 100 p. s. i. g. of pressure are maintained on the system to keep the excess BF$_3$ in the acid phase. The essentially single homogeneous acid phase is passed from mixer 31 by way of line 33 into reactor 34.

Reactor 34 is provided with heat exchanger means 36 and 37. Agitation is not needed to assist the reaction rate because of the single phase system existing in the reactor. To insure the maintenance of a substantially uniform temperature of +10° C. throughout the reactor, reactor 34 is provided with baffles 38$a$, 38$b$ and 38$c$ and motor driven agitator 39.

The acid phase is withdrawn from the top of reactor 34 and is passed by way of line 41 into the upper portion of displacing zone 42. The contacting time is measured as the time in mixer 31, reactor 34 and part of the total time in displacing zone 42. In this embodiment, a total time of about 10 minutes is utilized. (Other methods for complex formation, for temperature control and for obtaining the proper amount of contacting while avoiding disproportionation may be readily devised.)

Displacing zone 42 consists of a vertical vessel adapted for intimate contacting of two immiscible phases in a continuous countercurrent manner. (Other methods of contacting may be used.) In this embodiment, the displacer, mesitylene (1,3,5-tri-methylbenzene), from source 46 is passed by way of lines 47 and 48 into heat exchanger 49. The contents of line 48, i. e., "outside" and/or recycled mesitylene, are cooled in heat exchanger 49 to a temperature of +10° C. and are then introduced by way of line 51 into a lower intermediate portion of displacing zone 42. In this embodiment, 6 mols of displacer are introduced per mol of t-butyltoluenes introduced into the displacing zone from line 41.

The very great solvent power of the liquid HF-complex solution for aromatic hydrocarbons, is overcome by adding pentane to the displacing zone. Pentane from source 53 is passed by way of valved line 54 and line 56 into heat exchanger 57. The contents of line 56, i. e., pentane from source 53 and recycled pentane are cooled in heat exchanger 57 to +10° C. and introduced by way of line 58 into a lower portion of displacing zone 42, at a point below the entry of displacer from line 51. In this embodiment, 200 volume percent of pentane, based on t-butyltoluenes introduced from line 41, is introduced into displacing zone 42.

A raffinate phase is withdrawn overhead from zone 42. This consists essentially of mesitylene, pentane, benzene, toluene, meta t-butyltoluene, di-t-butyltoluene and some slight amount of HF and BF$_3$. The raffinate phase is introduced by way of line 61 into fractionation zone 62. This zone 62 is shown schematically since one skilled in the distillation art can devise the proper method of separating the raffinate phase into a pentane fraction, also including the HF and BF$_3$; a benzene fraction; a toluene fraction; product t-butyltoluene and di-t-butyltoluene fractions and a displacer fraction.

A pentane fraction, which includes the HF and BF$_3$ present in the raffinate phase, is withdrawn and passed by way of lines 66 and 67 to line 56 for reuse in the displacing zone 42.

A benzene fraction is withdrawn from zone 62 and passed to storage by way of line 70. A toluene fraction is withdrawn and is recycled for reuse by way of lines 71 and 72.

A product fraction consisting essentially of meta t-butyltoluene is withdrawn from zone 62 by way of line 74. A bottoms fraction consisting of 1,3,5-di-t-butyltoluene is withdrawn by way of line 76. A mesitylene fraction is withdrawn and recycled to zone 42 by way of lines 77 and 79.

The extract (acid) phase is withdrawn from displacing zone 42 and is introduced by way of line 86 into decomposing zone 87. Decomposing zone 87 is provided with internal heater 88 and some fractionation means, not shown. The temperature of +40° C. in zone 87 is high enough to readily decompose the HF—BF$_3$ complexes but not high enough to disproportionate.

HF vapor and BF$_3$ gas are withdrawn from zone 87 and passed by way of line 91 into heat exchanger 92. In heat exchanger 92, the HF vapors are condensed and a liquid-gas stream is passed by way of line 93 into gas separator 94. BF$_3$ is withdrawn from gas separator 94 and is recycled by way of lines 96 and 29 to mixer 31. Make-up BF$_3$ is introduced from source 98 by way of valved line 99 into line 96. Liquid HF is recycled by way of lines 101 and 26. Make-up HF is introduced from source 102 by way of valved line 103 into line 101.

The hydrocarbon fraction is withdrawn and introduced by way of line 106 into fractionation zone 107, shown schematically herein. A pentane fraction is withdrawn and recycled by way of lines 109 and 67, etc. to displacing zone 42. A benzene fraction is withdrawn by way of line 110. A toluene fraction is withdrawn and recycled by way of lines 111 and 72, etc. to mixer 31. A bottoms fraction consisting mainly of high boiling side-reaction products and some slight amount of t-butyltoluenes, is withdrawn by way of line 113. A mesitylene fraction is withdrawn and recycled to zone 42 by way of lines 116 and 79.

benzene and that with di-ethylbenzene charge the interaction is readily halted at the exclusively meta-ethyltoluene product stage.

TABLE I

| Run No. | 1 | | 2 | | 3 | | 4 | |
|---|---|---|---|---|---|---|---|---|
| Charge: Donor, type | Ethylbenzene | | Di-ethylbenzene | | Isopropylbenzene | | p-di-t-butylbenzene | |
| | mols | percent | mols | percent | mols | percent | mols | percent |
| Donor | 1.44 | 46 | 0.81 | 33 | 1.43 | 50 | 0.82 | 27 |
| Toluene | 1.66 | 54 | 1.65 | 67 | 1.44 | 50 | 2.17 | 73 |
| Toluene/Donor Alkyl Groups, ratio | 1.15 | | 1.02 | | 1.01 | | 1.32 | |
| HF, mols | 35 | | 30 | | 37.5 | | 30 | |
| BF$_3$, mols | 4.4 | | 2.36 | | 3.09 | | 3.43 | |
| HF/Feed, ratio | 11.3 | | 12.2 | | 13.1 | | 10.0 | |
| BF$_3$/Donor Alkyl Groups, ratio | 3.06 | | 1.46 | | 2.16 | | 2.09 | |
| BF$_3$/Donor, ratio | 3.06 | | 2.92 | | 2.16 | | 4.18 | |
| Temperature, °C | +19 | | +20 | | +12 | | +7 | |
| Time, Minutes | 30 | | 30 | | 30 | | 15 | |
| Product Recovery, Percent | ---- | | 96 | | 96 | | 90 | |
| Reaction Product Mixture, mol percent: | | | | | | | | |
| Benzene | 37.2 | | 6.3 | | 42.7 | | 26.1 | |
| Toluene | 25.7 | | 45.0 | | 14.0 | | 32.1 | |
| Alkylbenzene | 0.8 | | 0.0 | | 0.5 | | 0.0 | |
| m-Alkyltoluene | 26.2 | | 19.1 | | 34.5 | | 23.7 | |
| m-Di-alkylbenzene | 8.5 | | 29.6 | | 2.5 | | 0.0 | |
| 1,3,5-Di-alkyltoluene | 1.6 | | 0.0 | | 5.9 | | 16.2 | |
| Higher boiling | 0.0 | | 0.0 | | 0.0 | | 1.9 | |

Examples

The results obtainable by the invention are illustrated by the following examples: The runs were carried out using a carbon steel reactor provided with a 1725 R. P. M. stirrer. The agent and reactants were added in the following order: (1) the alkyl group donor, (2) the alkyl group acceptor toluene, (3) commercial grade anhydrous HF and (4) commercial grade BF$_3$.

The contents of the reactor were agitated during the addition of the HF and BF$_3$. The contacting was continued at about constant temperature for the desired time.

The contents of the reactor were withdrawn into a vessel filled with crushed ice. An upper hydrocarbon layer formed over an aqueous layer. The hydrocarbon layer was decanted and washed with dilute ammonium hydroxide solution to remove HF and BF$_3$. The hydrocarbons were then water washed to remove ammonium hydroxide.

The hydrocarbon mixture was fractionated in a distillation column providing about 30 theoretical plates. Each product fraction was analyzed by a combination of boiling point, specific gravity, refractive index, ultraviolet and infrared spectra.

The detailed results of the interaction of toluene and di-t-butylbenzene, isopropylbenzene and ethylbenzenes, respectively, are shown in Table I. Runs with isopropylbenzene and ethylbenzenes are shown for comparison.

In run 1 98% of the ethylbenzene charged was converted. About one-third of the ethylbenzene disproportionated to m-di-ethylbenzene. Less than 10% of the interacted ethyl groups passed to 1,3,5-di-ethyltoluene. No tri-ethyltoluene or tri-ethylbenzene were produced. (In all runs the di-alkylbenzenes were meta isomer and the tri-alkylbenzenes were the 1,3,5-isomer, that is, within the error of infrared determination.)

Run 2 shows that di-ethylbenzene does not give the same product distribution as ethylbenzene, when operating at substantially the same conditions. Only 23% of the di-ethylbenzene interacted. Most surprisingly none of the di-ethylbenzene disproportionated to tri-ethylbenzene; also no ethylbenzene was produced. Runs 1 and 2 show that di-ethylbenzene is not as reactive as ethyl- In run 3 about 99% of the isopropylbenzene charged was converted. Only 5% of the isopropylbenzene disproportionated to produce di-isopropylbenzene—no tri-isopropylbenzene was formed. About 30% of the interacted isopropyl groups went to form di-isopropyltoluene. This compares with only 10% in the case of ethylbenzene in run 1. (The disparity is actually greater since run 3 was at a lower temperature than run 1.)

The extreme mobility of t-butyl groups is well shown in run 4. Even though the feed was a di-t-butylbenzene and the conversion was carried out at a lower temperature and for only one-half the time of the other runs, virtually all of the di-t-butylbenzene interacted. In the absence of toluene, di-t-butylbenzene disproportionates rapidly to a mixture of mono-di- and tri-t-butylbenzene. Despite the low temperature and time an appreciable amount of side-reactions took place to produce high boiling material. Here about 60% of the interacted t-butyl groups went to form di-t-butyltoluene.

Quite a starting difference exists between the product distribution of run 2 (di-ethylbenzene) and run 4. Runs 1, 3 and 4 show that di-t-butylbenzene is much more reactive than isopropylbenzene and very much more reactive than ethylbenzene. These runs show that the interaction characteristics of the ethyl, isopropyl and t-butyl groups are not predictable—one from the other.

Thus having described the invention, what is claimed is:

1. An interaction process which comprises contacting, under substantially anhydrous conditions, a feed comprising essentially (a) toluene and (b) a member selected from the class consisting of t-butylbenzene, di-t-butylbenzene, tri-t-butylbenzene and mixtures thereof, as essentially the only reactive components, in a mol ratio of toluene to t-butyl groups in said butylbenzene of at least about 1, with between about 3 and 50 mols of liquid HF per mol of alkylbenzene feed and at least about 1 mol of BF$_3$ per mol of t-butyl groups in said butylbenzene, at a temperature of not more than about +25° C. for a time sufficient for the formation of a fraction consisting essentially of meta-t-butyltoluene, contacting the acid phase with at least about 1 mol of a displacer per mol of t-butyltoluenes present in said acid phase and substantially simultaneously thereafter with an amount of an inert liquid hydrocarbon sufficient to extract from said acid phase displaced t-butyltoluenes, at a temperature of not more than about +25° C. and time such that substantially no reactions take place, and separating a separate raffinate phase comprising inert hydrocarbon and t-butyltoluenes and recovering from said raffinate phase t-butyltoluenes comprising essentially the meta t-butyltoluene and 1,3,5-di-t-butyltoluene and wherein said displacer is a polyalkylbenzene containing at least 3 alkyl groups that are selected from the class consisting of normal and secondary, which contain not more than 4 carbon atoms.

2. The process of claim 1 wherein said reaction contacting temperature is between about 0° C. and about +15° C. and said reaction contacting time at 15° C. is about 5 minutes and at 0° C. is about 30 minutes, the longer times corresponding to the lower temperatures, and said displacer contacting temperature is not more than about 15° C.

3. The process of claim 1 wherein between about 100 and 500 volume percent of inert hydrocarbon is used, based on t-butyltoluenes.

4. The process of claim 1 wherein said ratio of toluene to t-butyl groups is between about 1 and 1.2.

5. The process of claim 1 wherein said HF usage is between about 5 and 20 mols.

6. The process of claim 1 wherein said $BF_3$ usage is between about 1 and about 1.5 mols.

7. The process of claim 1 wherein said polyalkylbenzene is isodurene.

8. The process of claim 1 wherein said displacer is mesitylene.

9. The process of claim 1 wherein said hydrocarbon is hexane.

10. The process of claim 1 wherein said hydrocarbon is pentane.

11. The process of claim 1 wherein the mol ratio of displacer to t-butyltoluenes is between about 3 and about 10.

References Cited in the file of this patent
UNITED STATES PATENTS

| | | |
|---|---|---|
| 2,527,824 | Kemp | Oct. 31, 1950 |
| 2,528,893 | Lien | Nov. 7, 1950 |
| 2,564,073 | Lien | Aug. 14, 1951 |
| 2,725,413 | McCaulay et al. | Nov. 29, 1955 |
| 2,741,647 | McCaulay et al. | Apr. 10, 1956 |
| 2,756,264 | McCaulay et al. | July 24, 1956 |
| 2,768,985 | Schlatter | Oct. 30, 1956 |